United States Patent
Zona

[19]

[11] Patent Number: 5,931,359
[45] Date of Patent: Aug. 3, 1999

[54] CARRIER FOR A MOTOR-VEHICLE ROOF

[75] Inventor: Mauro Zona, Turin, Italy

[73] Assignee: Fabio Pedrini, Bologna, Italy

[21] Appl. No.: 08/894,100

[22] PCT Filed: Aug. 8, 1996

[86] PCT No.: PCT/EP96/00581

§ 371 Date: Oct. 8, 1997

§ 102(e) Date: Oct. 8, 1997

[87] PCT Pub. No.: WO96/25306

PCT Pub. Date: Aug. 22, 1996

[30] Foreign Application Priority Data

Feb. 17, 1995 [IT] Italy .................................. TO95A0117

[51] Int. Cl.⁶ ............................ B60R 9/045; B60R 9/058
[52] U.S. Cl. ......................... 224/321; 224/319; 224/322; 224/329
[58] Field of Search ..................... 224/322, 329, 224/330, 331, 321, 323, 326, 325, 319

[56] References Cited

U.S. PATENT DOCUMENTS 5,226,570  7/1993  Pedrini .
5,275,320  1/1994  Duemmler ............................... 224/331
5,397,042  3/1995  Pedrini .
5,758,810  6/1998  Stapleton ................................ 224/321

FOREIGN PATENT DOCUMENTS 909737    9/1972   Canada .
0609152   8/1994   European Pat. Off. .
1123398   9/1956   France .
2583358   12/1986  France .
502494    3/1939   United Kingdom .
WO94/21490 9/1994  WIPO .
WO95/32104 11/1995 WIPO .

*Primary Examiner*—Linda J. Scholl
*Attorney, Agent, or Firm*—Sughrue, Mion, Zinn, Macpeak & Seas, PLLC

[57] ABSTRACT

A carrier bar for a motor-vehicle roof is provided at each of its ends with a supporting leg (6) having a head (5) slidably mounted within a guide rail (3) of the bar (1). The head (5) is axially movable along with a threaded stem (7) which is screwed in a threaded channel (4) of the bar (1) and can be rotated to cause a movement of the supporting leg (6) along the bar (1). The bar has a bolt (13) with an enlarged head (14) which engages a slot (15) of a hook member (12) having a hook (17) adapted to engage the side edge of a motor-vehicle roof.

11 Claims, 5 Drawing Sheets

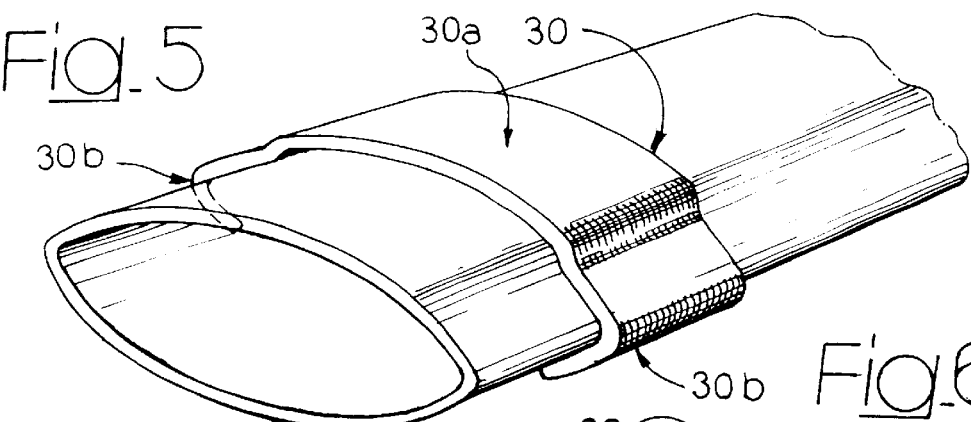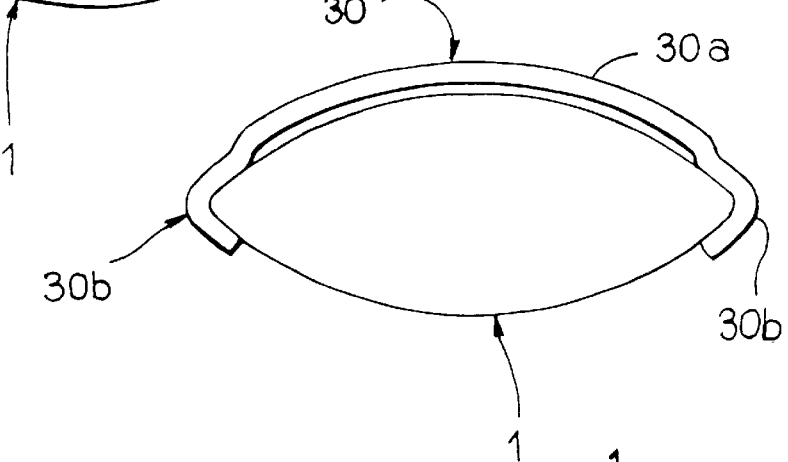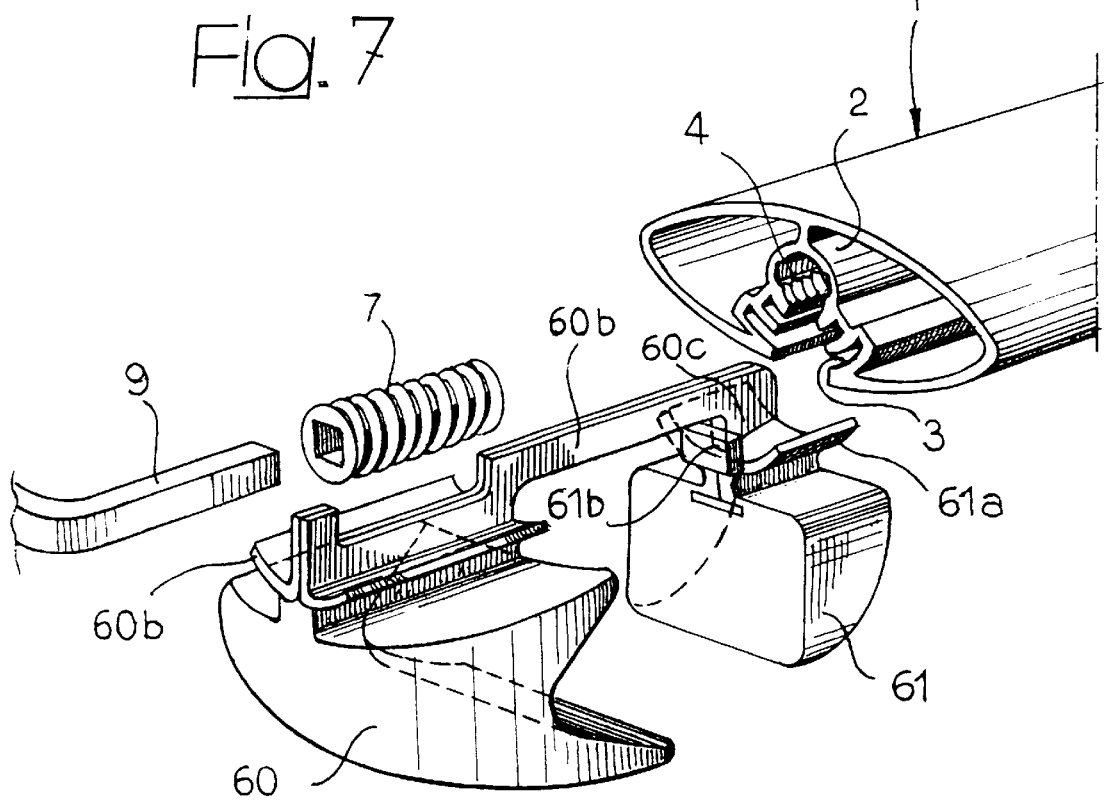

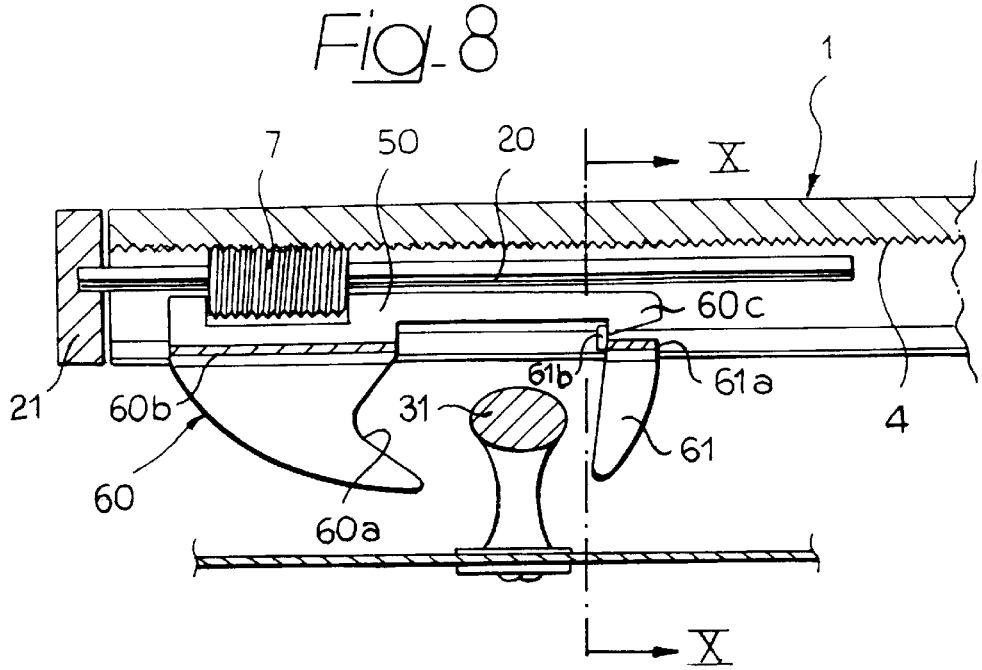
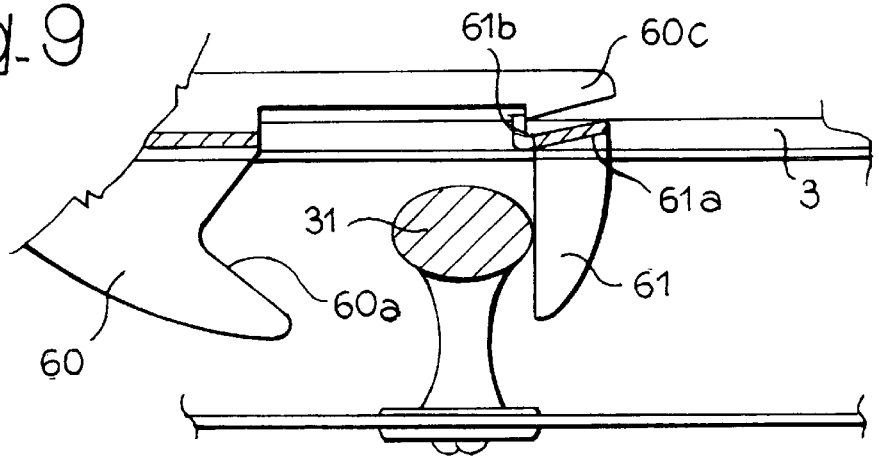
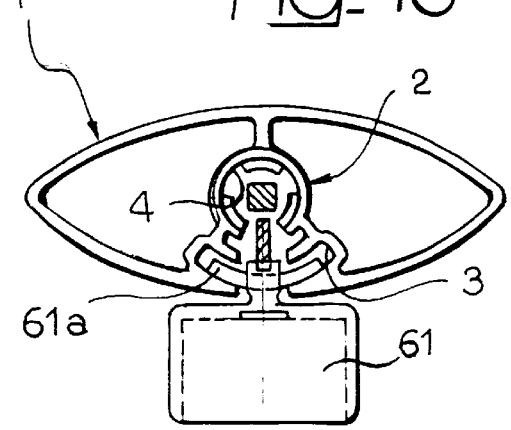

CARRIER FOR A MOTOR-VEHICLE ROOF

BACKGROUND OF THE INVENTION

The present invention relates to carriers for motor-vehicle roofs of the type comprising:
  a bar, having end portions and a longitudinal guide rail provided at least along each of said end portions,
  two bar supporting legs, which are to be supported on a roof of a motor-vehicle with the bar arranged transversely to the longitudinal direction of the motor-vehicle, each of said legs being slidably mounted within a respective one of said guide rails on said bar, and
  screw-and-nut control means operatively interposed between said bar and each of said legs for controlling movement of each leg along the respective guide rail.

A carrier for a motor-vehicle roof having the above indicated features is known from U.S. Pat. No. 5,226,570 and U.S. Pat. No. 5,397,042. However, the construction of this known carrier is relatively complicated and costly.

SUMMARY OF THE INVENTION

The object of the present invention is that of providing a carrier for a motor-vehicle roof which has a simple structure comprised of a reduced number of parts, inexpensive to manufacture and assemble, which can be mounted on a roof of a motor-vehicle easily and rapidly, which can be adapted to even very different configurations of motor-vehicle roofs and can be mounted also adjacent to the rear end of the roof, while insuring an absolute reliability and safety of the connection to the motor-vehicle structure.

In order to satisfy efficiently all the above mentioned needs, the present invention provides a carrier for a motor-vehicle roof of the type indicated at the beginning, wherein said screw-and-nut control means comprises:
  a threaded longitudinal end channel formed within each end portion of said bar,
  two threaded members, each screwed into a respective one of said threaded end channels of the bar and operatively connected to the respective bar supporting leg with respect to movements along the longitudinal direction of the bar,
  means for rotating each of said threaded members, so as to cause each threaded member to move axially within the respective threaded end channel, also causing thereby the longitudinal movement of the corresponding leg along said guide rail.

The bar can be comprised for example of a profiled element, for example an extruded element of light alloy, in which said guide rails and said channels are formed by a single operation, after which said channels are then subject to a tapping operation. Each bar supporting leg can have a sheet metal structure, easy and inexpensive to manufacture.

The above mentioned means for rotating each threaded member comprises an operating tool which is slidably engagable within an axial hole having a non-circular cross section formed though each threaded member.

Alternatively, said threaded end channels may be formed with oppositely wound threads and the means for rotating the threaded members in this case comprise a single rod rotatably mounted within the bar and slidably engageable within said threaded members, said rod having one end projecting outside of the bar and provided with an operating knob, to cause the simultaneous and symmetrical displacement of the two threaded members with respect to the centre of the bar.

As it will be clearly apparent, the structure of the carrier according to the invention is comprised of an extremely reduced number of parts and is simple and inexpensive to manufacture and assemble.

In a first embodiment of the invention, said legs are provided with feet adapted to rest on the motor-vehicle roof and said carrier further comprises two hook members respectively connected to the two bar supporting legs and able to engage the side edges of a roof of a motor-vehicle.

In order to proceed to the mounting on the motor-vehicle roof, in the case of the first embodiment, the bar supporting legs are placed with their feet on the roof and the rotation of the two threaded members is then driven (either at subsequent times or simultaneously, depending upon which of the above mentioned forms of the rotation control means is chosen) until the two hook members engaging the side edges of the motor-vehicle roof are put under tension.

In a second embodiment which is adapted to be mounted on two longitudinal guides fixed on the roof of a motor-vehicle, the said carrier supporting legs are in the form of two outer clamping jaws adapted to abut against the outer side surfaces of said longitudinal guides, said carrier further comprising:
  a pair of inner clamping jaws slidably mounted within said guide rails of said bar and adapted to abut against the inner side surfaces of said longitudinal guides,
  each pair of outer and inner clamping jaws associated with each longitudinal guide having mutual engagement surfaces adapted to co-operate with each other so that when each outer jaw is moved towards the respective end of the bar, it trails also the co-operating inner jaw therewith through said mutual engagement surfaces, whereas when each outer jaw is moved towards the centre of the bar, the co-operating inner jaw remains in a fixed position relative to the bar.

In the case of this second embodiment in order to mount the carrier on the motor-vehicle roof, the bar is placed transversely on the two longitudinal guides provided on the roof with each pair of outer and inner jaws in an opened condition. Starting from this condition, rotation of each threaded member is driven (at subsequent times or simultaneously), so as to move the outer jaws away from each other, i.e. towards the respective ends of the bar. This movement of the outer jaws causes a simultaneous outward movement of the respective inner jaws until the latter abut against the respective inner side surfaces of the longitudinal guides. At this time, rotation of each threaded member is inverted, so that each outer jaw is moved towards the respective longitudinal guide, while the co-operating inner jaw remains in a fixed position, until the outer jaws are put against the outer side surfaces of the longitudinal guides, thus clamping each guide between each pair of outer and inner clamping jaws.

Dismantling of the bar from the motor-vehicle roof is achieved by an inverted sequence of the above described operations.

According to a further preferred feature, said guide rails and the corresponding portions of the supporting legs which are slidably mounted within said rails are so shaped as to allow the angular position of each leg with respect to a central axis of the bar to be varied. Due to this feature, it is possible to mount the bar also adjacent for example to the rear edge of the motor-vehicle roof, with the rear foot of the bar supporting leg in engagement on the vehicle rear pillar (or C pillar) on one side of the rear window.

A preferred feature of the first embodiment of the invention lies in that said supporting feet are connected to the respective leg through an articulated joint which allows rotations both in a vertical plane perpendicular to the bar axis and in a vertical plane parallel to said axis while preventing rotations of the supporting foot in the horizontal plane.

According to a further feature, each of said hook members is separate from the respective bar supporting legs and has a slot wherein a bolt having an enlarged head projecting from the leg is engaged.

Preferably, said slot is formed in a counter sunk surface and said enlarged head has also a counter sunk shape, so as to allow small adjusting movements of said head relative to said surface, again in order to ensure that the bar may be adapted to any configuration of motor-vehicle roof.

Due to the above indicated features, the assembling of the bar on the roof becomes extremely easy and rapid, while ensuring an absolute safety of the connection to the motor-vehicle structure. Furthermore, the device according to the invention is able to be adapted efficiently to even very different configurations of motor-vehicle.

According to a further preferred feature of the invention, the carrier is provided with one or more support devices for supporting accessories such as a sky carrier or a bicycle carrier or the like, said supporting device comprising a substantially rigid element having a C-shaped configuration, adapted to be slidably mounted above the bar from one end thereof, with the central portion of said C-shaped element arranged on the upper surface of the bar, said C-shaped element being provided with means for locking said element on said bar.

BRIEF DESCRIPTION OF THE DRAWINGS

Further features and advantages of the invention will become apparent from the following description with reference to the annexed drawings, given purely by way of non limiting example, in which:

FIG. 5 is a diagrammatic perspective view showing an accessory support device used on the carrier according to the invention, FIG. 6 is an end view of the device of FIG. 5, FIG. 7 shows a perspective exploded view of one end portion of a second embodiment of the present invention, FIGS. 8, 9 show a cross-sectional view of the carrier of FIG. 7 in two different operating conditions, and FIG. 10 is a cross-sectional view taken along line X—X of FIG. 8.

DETAILED DESCRIPTION OF THE INVENTION

With reference to the drawings, the carrier according to the invention comprises a bar 1 which is comprised for example of a profile element of light alloy, obtained by an extrusion process. Bar 1 has, in the illustrated example, a cross-section having a substantial elliptical profile with pointed ends and a central core 2 in which a single longitudinal guide rail 3 is formed, along with a single threaded channel 4 having a circular cross-section, rail 3 and channel 4 both extending throughout the whole length of bar 1. It would also be possible, according to the present invention, to provide bar 1 with a guide rail similar to rail 3 and a threaded channel similar to channel 4 only at each of its end portions. Moreover, also the material forming bar 1 and the manufacturing technology of bar 1 could be of any other type different from those described above.

Figure 3:
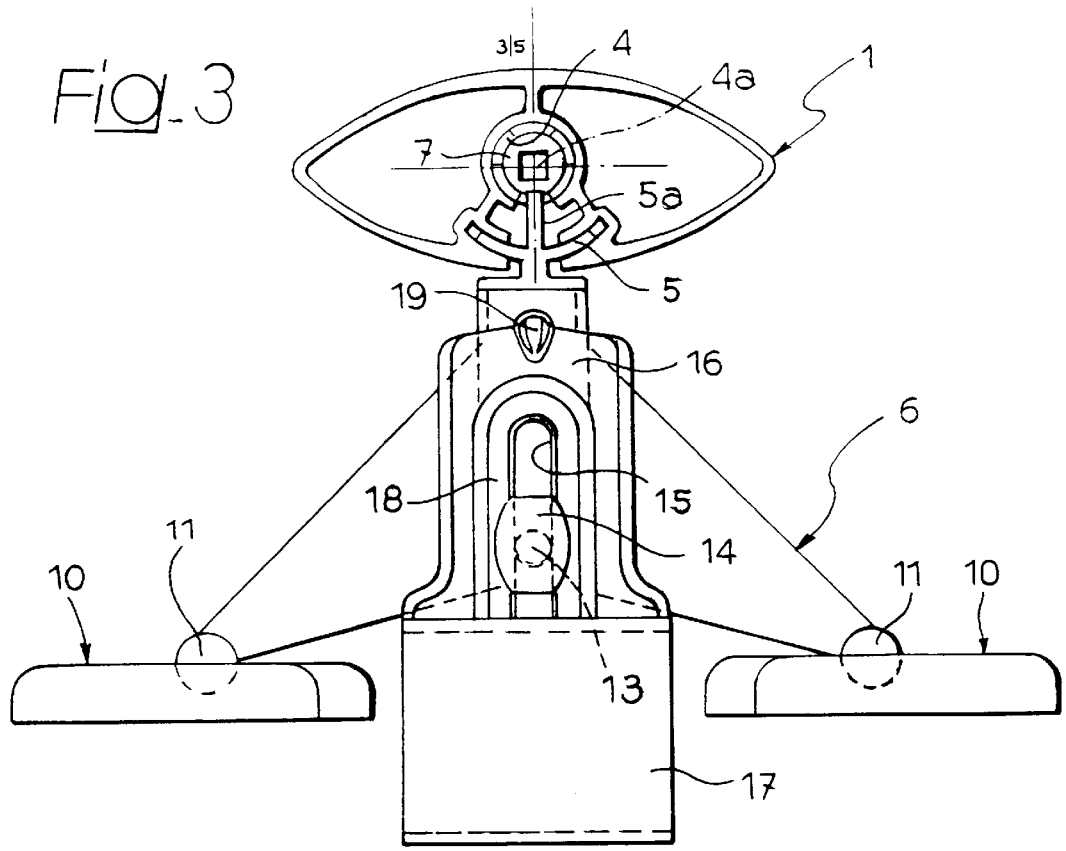
FIGS. 3, 4 are two end views of the carrier of FIG. 1 in two different operating conditions.

At each end of bar 1, within guide rail 3 there is slidably mounted the head 5 of a respective leg 6 for supporting bar 1. In the illustrated example, the structure of leg 6, including the structure of head 5, is made of pressed sheet metal. As clearly apparent from FIGS. 1 and 3, 4, in the case of the illustrated example, guide rail 3 has a cross-section formed as an arch coaxial with axis 4a of threaded channel 4 and head 5 has the form of a channel with a corresponding arched cross-section. Therefore, head 5, beside sliding axially within guide rail 3, is able to assume different angular positions within this rail around axis 4a (FIG. 3) of channel 4. Head 5 also has two projecting end teeth 5a between which there is axially locked a threaded stem 7 which is screwed into threaded channel 4. As already indicated, the structure described herein relates to a single end of the bar, but it is clearly apparent that the same arrangement of parts is provided at the opposite end.

Figure 1:
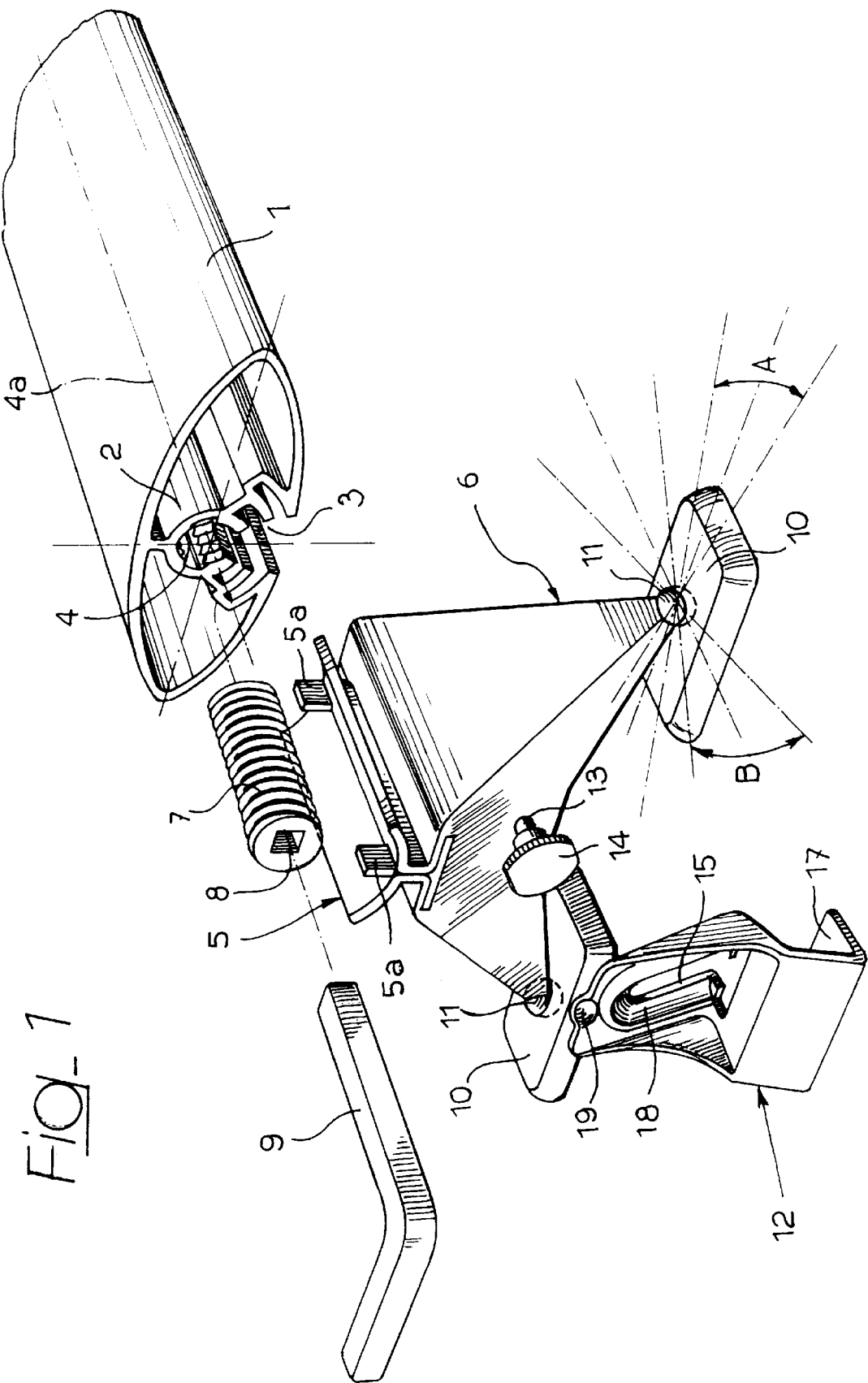
FIG. 1 is a perspective exploded view of one end portion of a carrier according to a first embodiment of the invention.

In the case of the arrangement shown in FIG. 1, threaded stem 7 has an axial hole 8 with a square cross-section which is slidably engageable by a operating tool 9.

By inserting tool 9 into hole 8, it is possible to rotate the threaded stem 7, so as to screw or unscrew the same within the respective threaded channel 4. As a result, stem 7 is moved axially within channel 4 towards or away from the centre of the bar. While moving axially within channel 4, threaded stem 7 moves therealong the supporting leg 6, which is guided during this movement by the engagement of head 5 within guide rail 3.

Each supporting leg 6 of the bar has two supporting feet 10, for example made of metal plates covered with a rubber layer, which are connected to leg 6 by a spherical joint 11. Joints 11 are made so as to allow pivoting of the respective foot 10 both in a vertical plane orthogonal to axis 4a of bar 1 (arrow A in FIG. 1) and pivoting in a vertical plane parallel to axis 4a (arrow B in FIG. 1). However rotations of each supporting foot 10 in a horizontal plane are prevented. Each supporting leg 6 is secured to the motor-vehicle roof by a hook member 12, which in the illustrated example is made by a formed sheet metal element separate from the structure of the respective leg 6. The latter has a bolt 13 with an enlarged head 14 which is received within a slot 15 formed in a portion 16 of hook member 12. Portion 16 is arranged in a plane inclined with respect to a vertical plane orthogonal to axis 4a of bar 1, so that, during mounting of the bar, when the threaded stem 7 is rotated by the operating tool 9, so as to move leg 6 towards the centre of bar 1 (after that the end hook 17 of member 12 has been engaged on the side edge of the motor-vehicle roof), member 12 is put under tension and ensures a safe locking. In this condition, leg 6 is firmly pressed against the motor-vehicle roof, on which the feet 10 rest, whereas head 5 of each leg 6 is slightly inclined within guide rail 3 so as to prevent any possibility of sliding within guide rail 3. Once said operations have been repeated for both supporting legs 6 associated to the two ends of bar 1, the safety of the connection is therefore totally assured. The possibility that feet 10 rotate both in the direction indicated by arrow A and in the direction indicated by arrow B in FIG. 1, along with the possibility of supporting leg 6 to be arranged in a rotated position with respect to axis 4a of bar 1 (FIG. 4) ensure that the carrier according to the invention be adapted to any configuration of motor-vehicle roof. The carrier can be mounted also adjacent to the rear end of the roof, where the rearmost supporting foot 10 is located at a lower level with respect to the other supporting foot (FIG. 4), for engaging the C pillar (not shown) of the motor-vehicle. In order to enable bar 1 to be arranged even more rearwardly, it is possible to provide a leg structure in which the head 5 is arranged asymmetrically with respect to the two supporting feet 10, i.e. offset towards the rearmost supporting foot.

Figure 4:
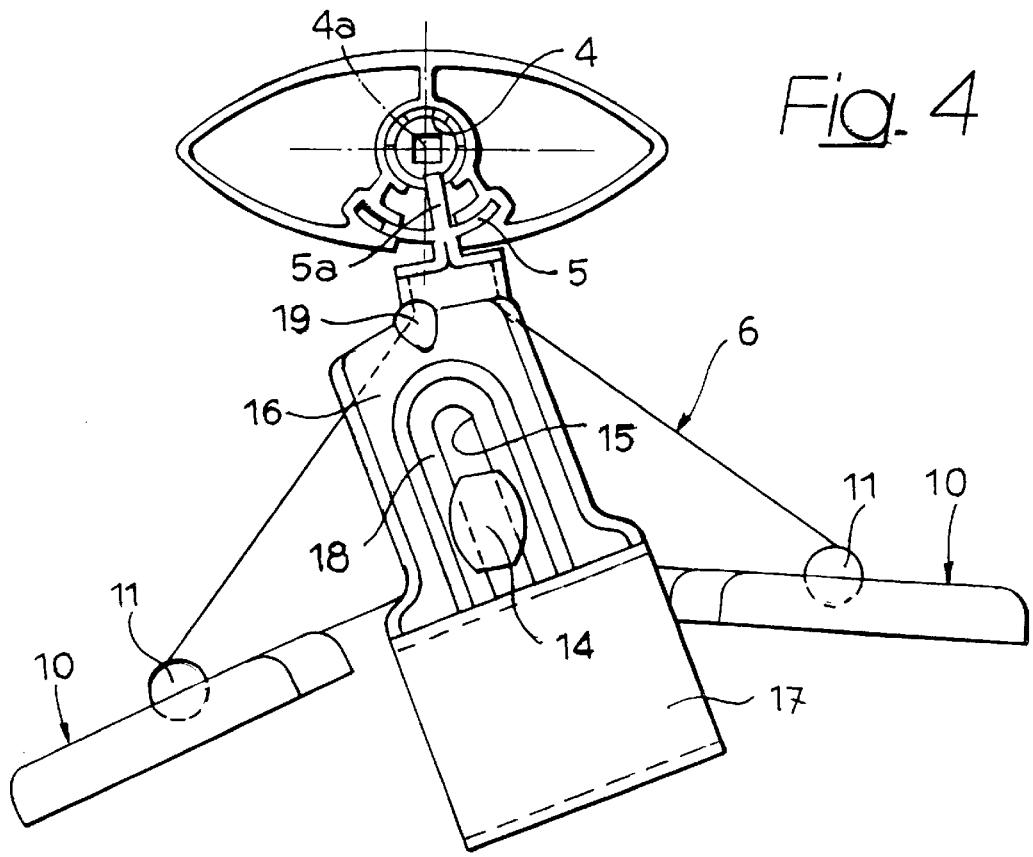

Turning back to hook member 12, slot 15 opens in a counter-sunk surface 18, on which there is engaged the enlarged head 14 of bolt 13, which also has a counter-sunk shape, so as to allow small adjustments of head 14 on surface 18 (see for example FIG. 4). Hook member 12 also has an upper projection 19, made by deforming the sheet metal of member 12, which is the single upper contact point between member 12 and the leg structure 6, thus avoiding damages to said parts of sheet metal as a result of a mutual sliding movement.

Figure 2:
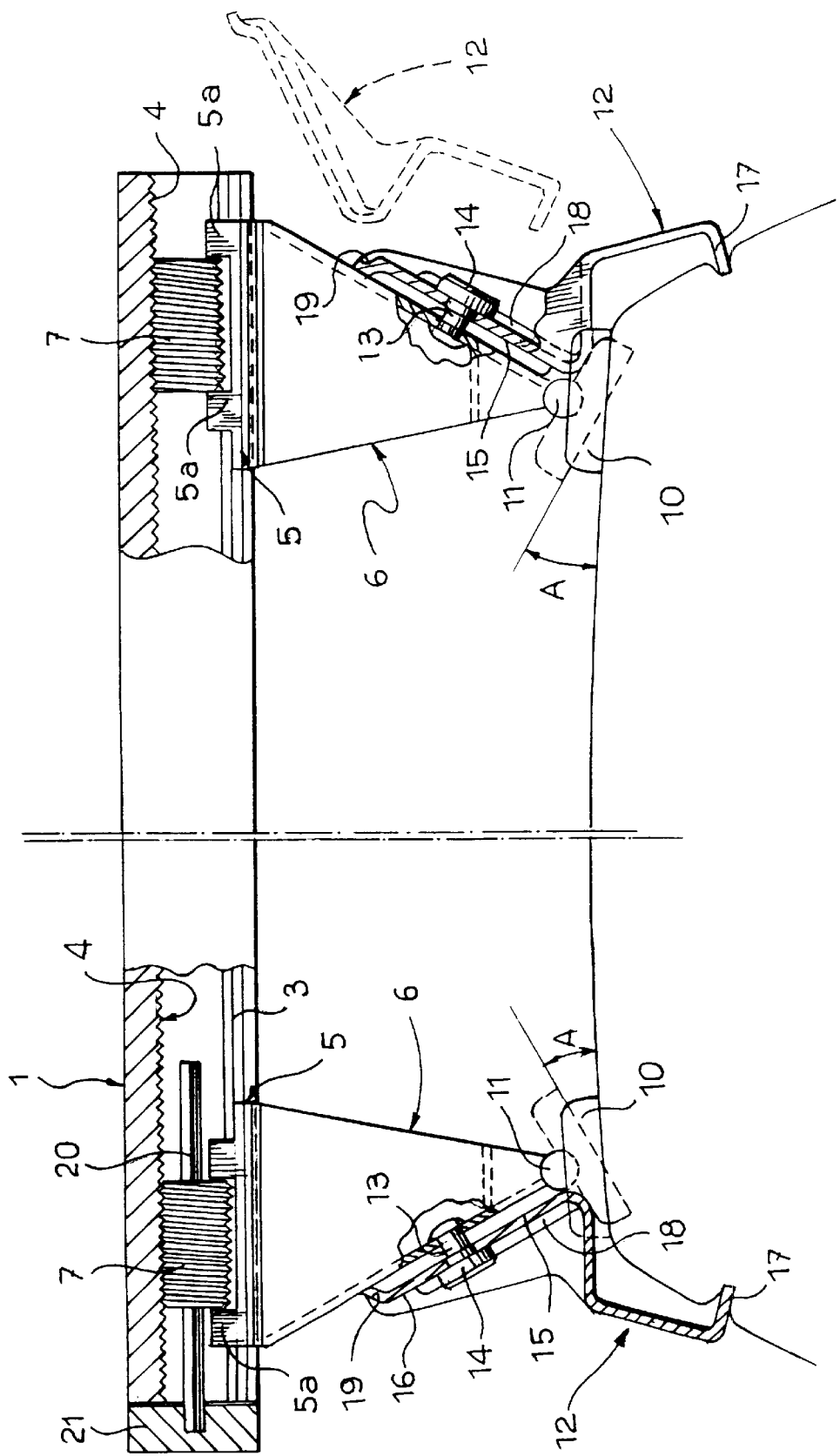
FIG. 2 is a front view, partially in cross section, of the carrier of FIG. 1 shown in a position mounted on a motor-vehicle roof.

FIG. 2 shows the carrier in the condition mounted on the motor-vehicle roof. This figure also shows a variant in which, in place of providing an operating key 9 which is engageable at subsequent times within the two threaded stems 7, in order to cause the axial movement firstly of one threaded stem and, if necessary, later on of the other threaded stem, a single rod 20 is provided (only partially visible in FIG. 2) which is rotatably mounted within the body of bar 1 and is slidably engageable within both threaded stems 7 in order to rotate them simultaneously. In this case, channel 4 has oppositely wound threaded portions at the ends of bar 1, so that a rotation of rod 20 causes the simultaneous movement of threaded stem 7 towards or away from each other. Rotation of rod 20 may be driven by a knob 21 firmly secured to one end of rod 20 which projects outside of bar 1.

FIGS. 5, 6 diagrammatically show a device 30 for supporting an accessory such as a bicycle carrier or a sky carrier or the like on bar 1. Device 30 is comprised of a substantially rigid C-shaped body with a central portion 30*a* and two end wings 30*b*. As shown in FIG. 6, the cross section of element 30 is adapted to be mated with the cross section of bar 1, so that element 30 can be mounted on bar 1 by causing it to slide on bar 1 starting from one end thereof, with the central portion 30*a* arranged above the upper surface of bar 1.

By this arrangement, body 30 can be rapidly and easily mounted on bar 1 while ensuring a stable support for the accessory (not shown) which is to be connected to body 30. The drawings do not show the details relating to the various types of accessories which can be carried by body 30, such as sky carriers, bicycle carriers, boat carriers or the like. These details of construction have been eliminated both because they may be of any known type and do not fall, taken alone, within the scope of the present invention, and because their elimination from the drawings renders the latter easier to understand. The same applies to the details relating to the locking device which may be provided on body 30 in order to axially lock this body on bar 1.

FIGS. 7–10 show a second embodiment of the carrier according to the invention which is adapted to be mounted on a motor-vehicle roof provided with two longitudinal guides 31 (only one of which is visible in FIGS. 8, 9). The structure of the embodiment of FIGS. 7–10 is substantially similar to that of the first embodiment and therefore, the same reference numerals have been used to designate corresponding parts. The main difference with respect to the first embodiment lies in that the supporting leg is not provided with feet 10 and is made in form of an outer jaw 60 having a V-shaped engagement surface 60*a* which is to engage the outer side surface of a longitudinal guide 31. In the mounted condition of the carrier, each longitudinal guide 31 is clamped between the respective outer jaw 60 and a co-operating inner jaw 61. With reference to FIG. 7, outer and inner jaws 60, 61 may have a body of rubber or similar material and are provided with respective heads 60*b*, 61*a* having an arched cross section adapted to be mated with the cross section of longitudinal guide rail 3. Moreover, head 61*a* has an upwardly projecting end tooth 61*b* which is adapted to be engaged by a hook 60*c* arranged at the free end of an elongated plate 60*d* forming part of head 60*b* and projecting therefrom towards the inner jaw 61. As in the case of FIGS. 1, 2, FIGS. 7, 8 respectively show the case of a bar 1 provided with two end channels 4 within which two threaded stems 7 are arranged which are rotated at subsequent times with the operating tool 9, and the case (FIG. 8) of a single rod 20 provided with an operating knob 21 adapted to rotate simultaneously the two threaded stems 7 which are arranged within oppositely threaded end portions of channel 4.

In order to mount the carrier of FIGS. 7–10 on the motor-vehicle roof, the carrier 1 is placed on the roof in the condition shown in FIG. 8, with each pair of outer and inner jaws 60, 61 in their opened condition. Starting from this condition, the threaded stem 7 is rotated so as to move the outer jaw 60 to the left (with reference to FIG. 8). Due to the engagement of hook 60*c* against tooth 61*b*, this movement causes also a simultaneous movement of the inner jaw 61, until the latter abuts against the inner side surface of the longitudinal guide 31. In this condition, the tool 9 of rod 20 is still rotated so as to push tooth 61*b* to the left (FIG. 9) until head 61*a* becomes inclined within rail 3. This inclination is allowed by the play due to the difference in thickness of head 61*a* and rail 3 (see also FIG. 10). Due to the inclination assumed by head 61*a* within rail 3 (see FIG. 9) head 61*a* becomes locked or wedged within rail 3. At this time, rotation of stem 7 is reversed so as to move each outer jaw 60 towards the longitudinal guide 31. During this movement, the inner jaw 61 remains in its position against the inner side surface of longitudinal guide 31, as shown in FIG. 9. Rotation of stem 7 is continued until the outer jaw 60 reaches the longitudinal guide 31 so as to clamp this guide between the outer jaw 60 and the inner jaw 61. In order to dismantle the carrier, the stem 7 must be rotated so as to move the outer jaw 60 away from the longitudinal guide 31. When the condition shown in FIG. 9 is reached, the carrier is raised. When the carrier has been separated from the roof of the vehicle, the outer jaws 60 may be brought again towards the inner jaws 61, until each jaw 60 abuts against tooth 61*b* thus exerting a pressure sufficient to unlock the head 61*a* which returns to a non-inclined condition parallel to rail 3.

From the foregoing description, it is clearly apparent that the device according to the invention is comprised of an extremely reduced number of parts, which can be manufactured and assembled easily and at low cost. The user can mount the carrier on the motor-vehicle roof with easy and rapid operations. The device is able to be adapted easily to even very different configurations of motor-vehicle and the bar can be arranged even at an extremely rearward position, adjacent to the rear edge of the motor-vehicle roof. Finally, the safety of the connection to the motor-vehicle structure is fully accomplished.

Naturally, while the principle of the invention remains the same, the details of construction and the embodiments may widely vary with respect to what has been described and illustrated purely by way of example, without departing from the scope of the present invention.

What is claimed is:

1. Carrier for a motor-vehicle roof, comprising:

a bar (1) having end portions and a longitudinal guide rail (3) provided at least along each of said end portions, two bar supporting legs (6, 60), which are to be supported on a roof of a motor-vehicle with the bar (1) arranged transversely to the longitudinal direction of the motor-vehicle, each of said legs (6, 60) being slidably mounted within a respective one of said guide rails on said bar (1), and screw-and-nut control means (4, 7) operatively interposed between said bar (1) and each of said legs (6, 60) for controlling movement of each leg (6, 60) along the respective guide rail, wherein said screw-and-nut control means comprises:

a threaded longitudinal end channel (4) formed within each end portion of said bar (1), two threaded members (7), each screwed into a respective one of said threaded end channels (4) of the bar (1) and operatively connected to the respective bar supporting leg (6, 60) with respect to movements along the longitudinal direction of the bar, means (9, 20) for rotating each of said threaded members (7), to move each threaded member (7) axially within the respective threaded end channel (4) and to move the corresponding leg (6, 60) longitudinally along said guide rail.

2. Carrier according to claim 1, wherein said means for rotating each threaded member (7) comprises an operating tool (9) slidably engageable within an axial hole (8) with a non-circular cross section formed though each threaded member (7).

3. Carrier according to claim 1, wherein said end threaded channels (4) have oppositely wound threaded portions, said means for rotating said threaded members (7) comprising a rod (20) rotatably mounted within bar (1) and slidably engageable within both threaded members (7) to control rotation thereof, said rod (20) having one end projecting outside of the bar (1) and provided with an operating knob (21), for simultaneously and symmetrically moving the two supporting legs (6, 60) with respect to the centre of bar (1).

4. Carrier according to claim 1, wherein said guide rails (3) and the corresponding portions (5, 60b, 61a) of the supporting legs (6, 60), which are slidably mounted within said rails are shaped to allow a variation in the angular position of each leg (6, 60), with respect to a central axis (4a) of the bar (1).

5. Carrier according to claim 1, wherein said supporting legs (6) are provided with feet (10) adapted to rest on the motor-vehicle roof and said carrier further comprises two hook members (12) respectively connected to the two supporting legs (6) and able to engage the side edges of a roof of a motor-vehicle.

6. Carrier according to claim 5, wherein said feet (10) are connected to the respective leg (6) by an articulated joint (11) which allows rotations both in a vertical plane perpendicular to the axis (4a) of bar (1), and in a vertical plane parallel to said axis, while preventing rotations of the foot in a horizontal plane.

7. Carrier according to claim 6, wherein each of said hook members (12) is separate from the respective bar supporting leg (6) and has a slot (15) engaged by a bolt (13) with an enlarged head (14) projecting from leg (6), said slot (15) being formed in a portion (16) of the hook member (12) arranged along a plane inclined with respected to a plane orthogonal to the axis (4a) of bar (1), so that a movement of the respective leg (6) towards the centre of the bar (1) puts the hook member (12) under tension once the latter has been engaged on the motor-vehicle roof.

8. Carrier according to claim 7, wherein said slot (15) is formed in a counter sunk surface (18) and said enlarged head (14) also has a counter-sunk shape, to allow small adjusting movements of said head (14) on said counter-sunk surface (18).

9. Carrier according to claim 1, adapted to be mounted on two longitudinal guides fixed on the roof of a motor-vehicle, wherein that said carrier supporting legs are in the form of two outer clamping jaws (60), adapted to abut against the outer side surfaces of said longitudinal guides (31) said carrier further comprising:

a pair of inner clamping jaws (61) slidably mounted within said guide rails (3) of said bar (1) and adapted to abut against the inner side surfaces of said longitudinal guides (31), each pair of outer and inner clamping jaws (60, 61) associated with each longitudinal guide having mutual engagement surfaces (60c, 61b) adapted to co-operate with each other so that when each outer jaw is moved towards the respective end of the bar (1), it trails also the co-operating inner jaw (61) therewith through said mutual engagement surfaces (61a, 61b), whereas when each outer jaw (60) is moved towards the centre of the bar (1) the co-operating inner jaw (61) remains in a fixed position relative to the bar.

10. Carrier according to claim 9, wherein each inner jaw (61) has a head (61a) received with play within the corresponding rail (3), so that when said mutual engagement surfaces (61a, 61b) press said inner jaw (61) against the corresponding inner side surface of the longitudinal guide (31), said head (61a) become inclined within the respective guide rail (3) so as to be locked in position within the latter.

11. Carrier according to claim 1, wherein said bar (1) is an extruded profile of light alloy.

* * * * *

UNITED STATES PATENT AND TRADEMARK OFFICE
CERTIFICATE OF CORRECTION

PATENT NO. : 5,931,359
DATED : August 3, 1999
INVENTOR(S) : Mauro Zona

It is certified that error appears in the above-identified patent and that said Letters Patent is hereby corrected as shown below:

On the title page, item [22], should read --
[22] PCT Filed: February 8, 1996.
--.

Signed and Sealed this

Sixteenth Day of May, 2000

Attest:

Q. TODD DICKINSON

Attesting Officer  Director of Patents and Trademarks